United States Patent [19]
Robertson et al.

[11] Patent Number: 5,656,157
[45] Date of Patent: Aug. 12, 1997

[54] SEPARATION OF COMPONENTS OF MIXTURES

[75] Inventors: Brooks A. Robertson; C. Patrick McKee; Alex R. Carra, all of Springfield, Mo.

[73] Assignee: Precision Stainless, Inc., Springfield, Mo.

[21] Appl. No.: 284,060

[22] Filed: Aug. 2, 1994

Related U.S. Application Data

[63] Continuation-in-part of Ser. No. 926,525, Aug. 5, 1992, abandoned.

[51] Int. Cl.$^6$ ..................................................... F26B 17/00
[52] U.S. Cl. ........................... 210/177; 34/576; 210/175; 210/180; 210/771; 210/198.1; 432/14
[58] Field of Search ..................................... 210/175, 177, 210/180, 771, 774, 512.1, 198.1; 34/369, 576, 580, 578, 594; 110/245; 432/14

[56] References Cited

U.S. PATENT DOCUMENTS

| | | |
|---|---|---|
| 3,879,856 | 4/1975 | Barr . |
| 4,135,311 | 1/1979 | Imbert . |
| 5,129,468 | 7/1992 | Olson ...................................... 210/771 |
| 5,259,123 | 11/1993 | Garcia-Mallol . |

*Primary Examiner*—David A. Reifsnyder
*Attorney, Agent, or Firm*—Senniger, Powers, Leavitt & Roedel

[57] ABSTRACT

In apparatus for separating the components of a mixture, the mixture is admitted to a first inlet which communicates with a working region which may be defined by a cylindrical tube. A fluid under pressure is admitted to a chamber through a second inlet. The chamber also communicates with the working region. The fluid forms a spiralling flow which draws the mixture into the working region in the form of a vortex. In the apparatus, the chamber communicates with the working region by way of a throat, and the mixture is conveyed from the working region along an outlet.

27 Claims, 11 Drawing Sheets

SEPARATION OF COMPONENTS OF MIXTURES

This is a continuation-in-part application of U.S. application Ser. No. 07/926,525, filed Aug. 5, 1992, now abandoned.

FIELD OF THE INVENTION

This invention relates to an apparatus for separating the components of a mixture, as in the de-watering of slurries such as sewage or coal slurries, and the removal of moisture from sludges, animal manure and other solid materials.

BACKGROUND OF THE INVENTION

Conventional methods of removing water from slurries generally consume large amounts of energy. For example, one known method involves the application of large quantities of heat in order to vaporize the water from the slurry. The invention aims to provide a simpler and more efficient apparatus.

SUMMARY OF THE INVENTION

Among the several objects and features of the present invention may be noted the provision of apparatus for separating the components of a mixture which is energy efficient; the provision of such apparatus which is readily adjustable for drying mixtures of various composition and liquid content; the provision of such apparatus which is capable of rapidly processing large amounts of the liquid; and the provision of such apparatus which is economical to manufacture and easy to use.

According to one aspect of the invention apparatus for separating the components of a mixture comprises a first inlet to admit the mixture, a second inlet to admit a fluid under pressure, an outlet for the components of the mixture and the fluid and a chamber into which the second inlet leads. The fluid admitted into the chamber moves in a spiralling flow. The downstream end of the first inlet communicates with a working region of the apparatus, and the working region communicates with the chamber by means of a throat through which the spiralling fluid is drawn into the working region.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

With reference to FIGS. 1–4, an apparatus of a first embodiment is shown to comprise an open-ended cylindrical outer sleeve or casing 6 having at each end a respective outer, radial, annular flange 8 and 10 for attachment to an end piece 3 and an inner sub-assembly 4. As can be seen from FIG. 4, the casing 6 includes an opening 7 which communicates with an inlet pipe 9 so as to provide an inlet for a pressurized fluid.

Figure 1:
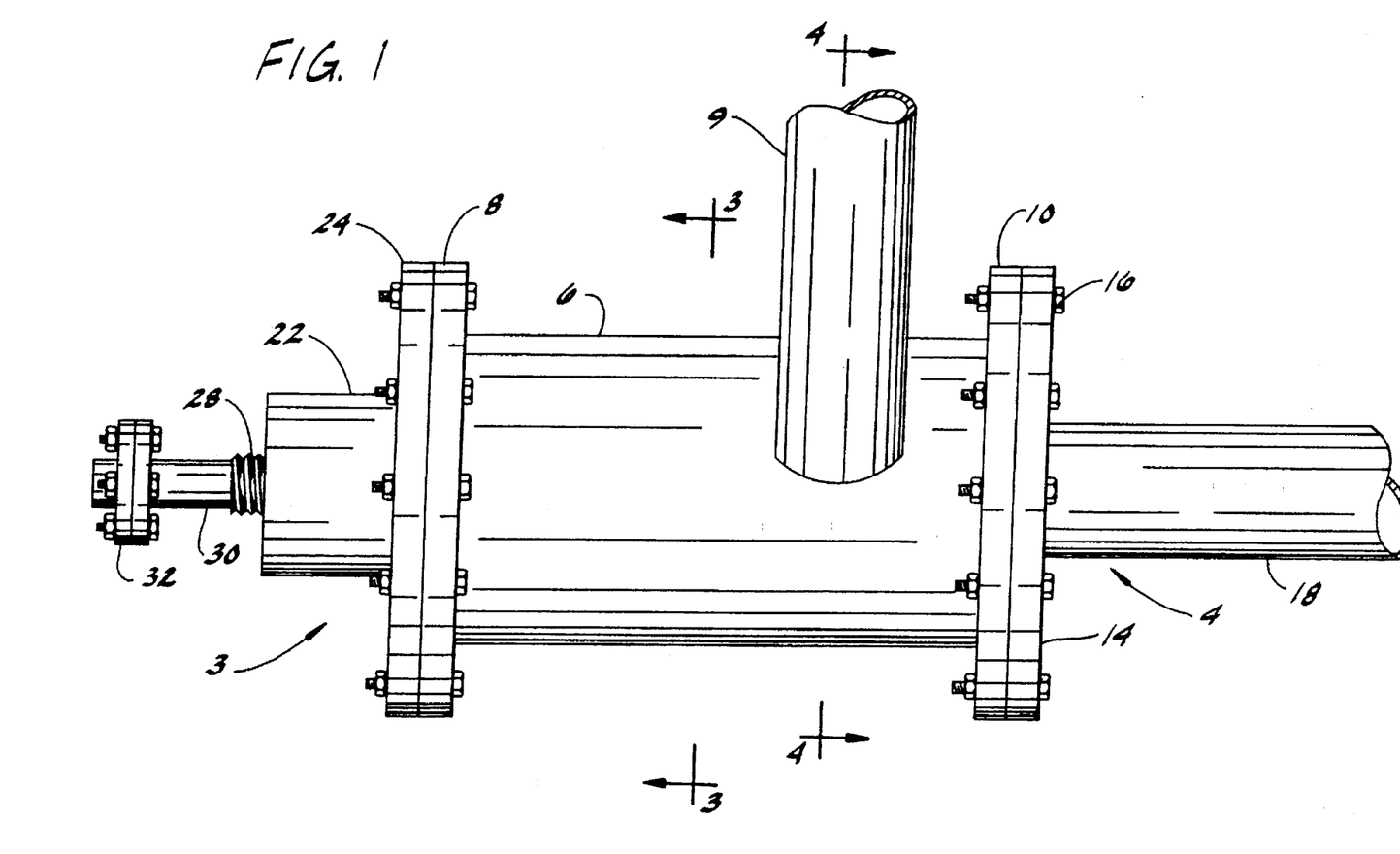
FIG. 1 is a side elevation of apparatus of a first embodiment of the invention.
Figure 2:
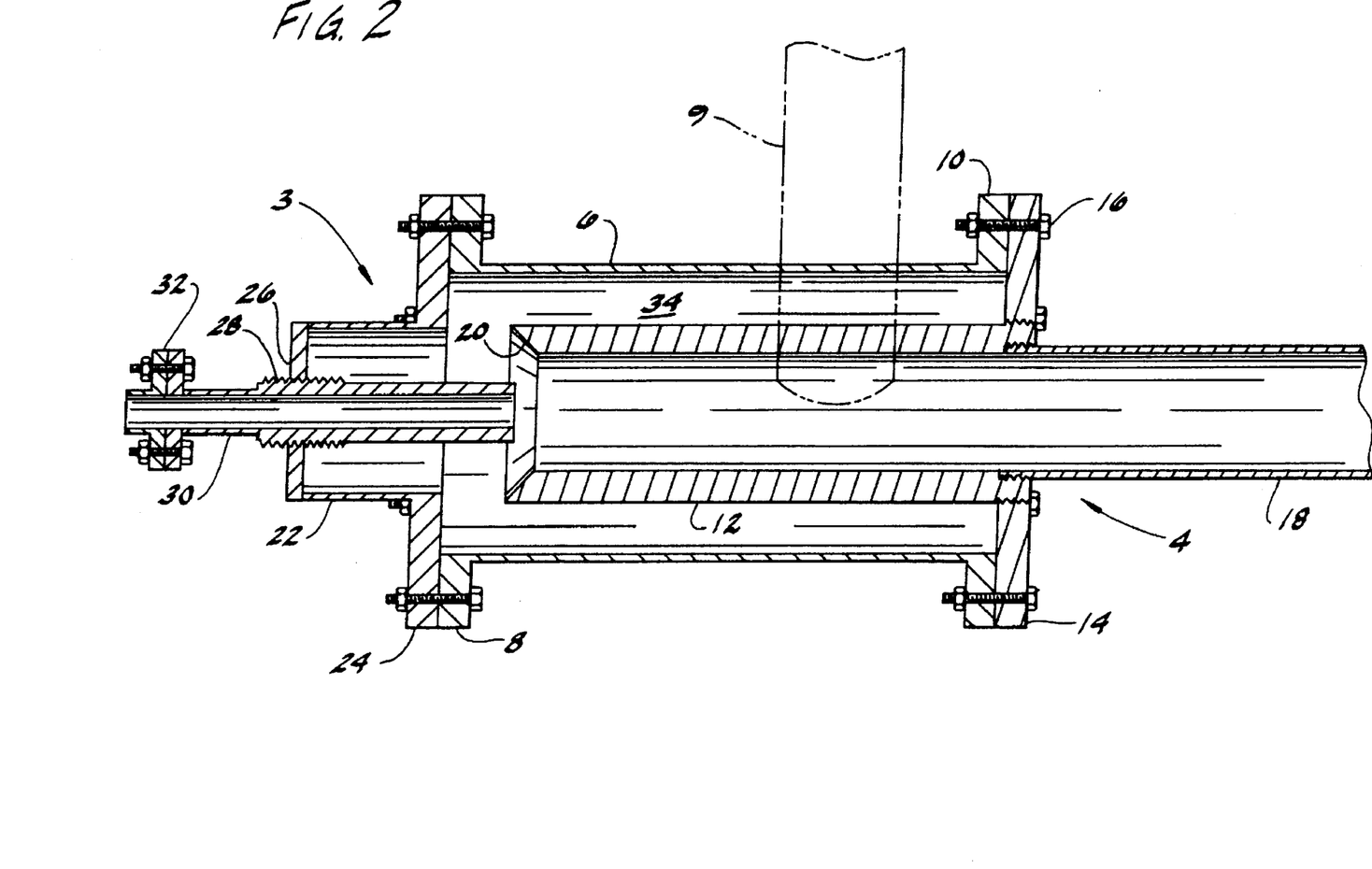
FIG. 2 is a longitudinal section of the apparatus of FIG. 1.
Figure 3:
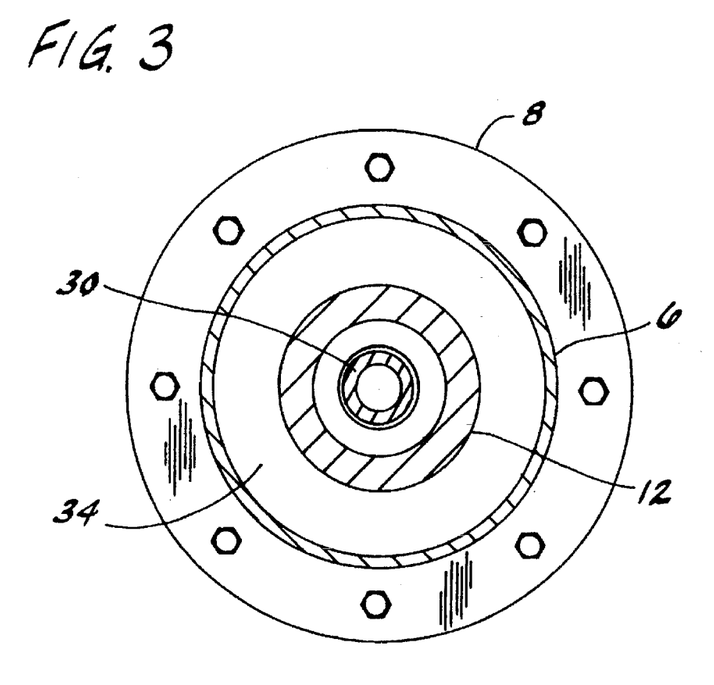
FIG. 3 is a section on the line III—III of FIG. 1.
Figure 4:
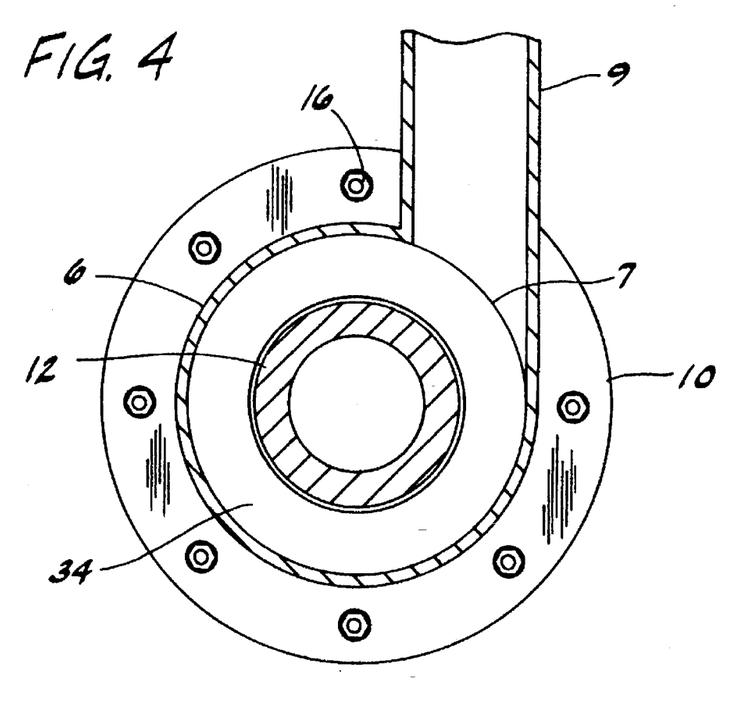
FIG. 4 is a section on the line IV—IV of FIG. 1.
Figure 5:
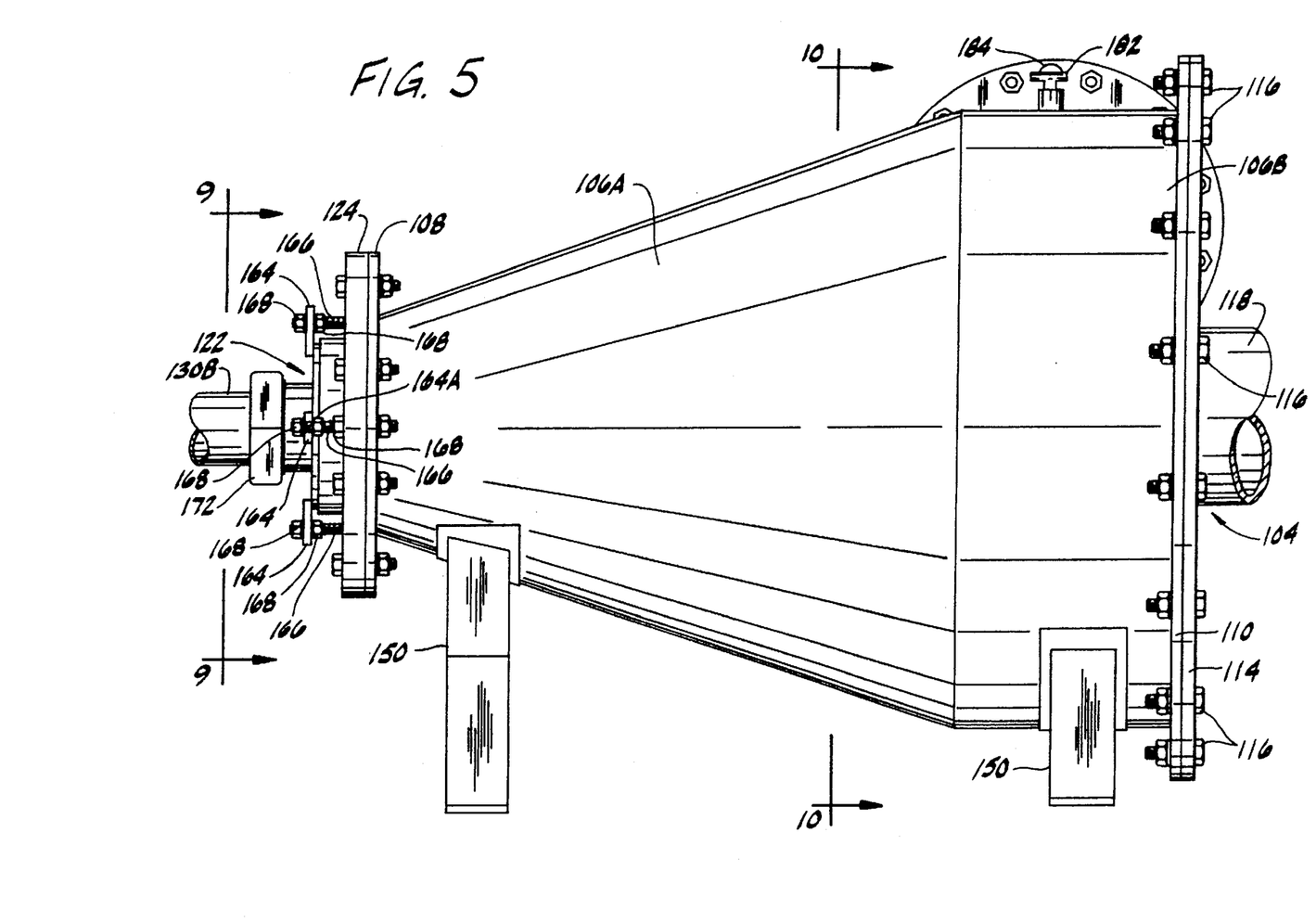
FIG. 5 is a side elevation of apparatus of a second embodiment of the invention.

The sub-assembly 4 includes a cylindrical tubular structure or working tube 12 which extends axially into the casing 6 and is screwed at its downstream end to the inner circumference of a ring 14. The terms "downstream" and "upstream" as used herein refer to the direction D of flow of matter through the working tube 12. The ring 14 is, in turn, bolted onto the flange 10 by means of a plurality of nuts and bolts such as at 16 which extend through corresponding pairs of aligned bores in the ring 14 and flange 10. The downstream end of the working tube 12 is also connected to an outlet tube 18 of the same internal diameter as the working tube by means of a screw threaded connection. The opposite end of the working tube 12 includes a bevel 20 at an angle of 45° with the circumferential outer surface of the working tube 12. It is to be understood that the angle of the bevel 20 may be other than 45° and still fall within the scope of the present invention.

The end piece 3 comprises a tubular mounting collar 22 having a radial flange 24 bolted to the flange 8 in a similar fashion to the connection between the ring 14 and flange 10. The mounting collar 22 includes a central internally screw threaded aperture 26 which is engaged by a corresponding screw-threaded portion 28 of an inlet tube 30 to allow adjustment of the axial position of the tube 30 relative to the working tube 12. The tube 30 includes an end connector 32 at its upstream end adapted to be connected to a supply line for the mixture to be processed and extends into the interior of the casing 6 as far as the region of the end 20 of the working tube 12.

The working tube 12 is spaced from the casing 6 and the end piece 3 so as to define an annular chamber 34 surrounding and generally co-axial with the working tube. The chamber 34 communicates with the inlet pipe 9 and with the inner volume of the working tube 12 through a throat defined between the downstream end of the inlet tube 30 and the bevel 20 of the working tube. It will be seen that the effective width of the throat may be varied by appropriate axial movement of the tube 30.

The pipe 9 is connected to a pump (not shown) which, in use, supplies atmospheric air to the chamber 34 at a pressure of 1.5–4 pounds per square inch and a speed of 8–10 thousand feet per minute.

Since the inlet pipe 9 admits air to the chamber 34 in a tangential direction, that air forms a spiralling flow in the chamber 34 with a mean axial component in the direction of the end 20 of the working tube 12. The air thus travels along the chamber 34 until it reaches the throat formed between the bevel 20 and the tube 30. As the air passes through the throat it accelerates, creating a region of low pressure in the region of the throat, and then forms a vortex in the working tube 12, which vortex travels toward the outlet pipe 18.

A slurry, for example coal slurry, is fed through the tube 30 towards the end 20 of the working tube 12, where the zone of low pressure tends to draw the slurry into the working tube 12. It is believed that as the slurry passes through the working tube 12, the energy in the vortex of air vaporizes the liquid component (water) which may then be separated from the solid coal by, for example, a cyclone separator connected to the downstream end of the pipe 18. It is believed that as the air passes through the throat at the end 20 of the working tube 12, it undergoes an adiabatic expansion, causing a substantial drop in temperature. This makes the apparatus particularly useful for de-watering coal slurries, in which high temperatures may lead to a risk of explosion.

In one specific example of the apparatus, the distance between the axis of the inlet pipe 9 and the flange 10 is 4.6 inches; the external diameter of the casing 6 is 10 inches, the external diameter of the working tube 12 is 6 inches; the diameter of the flanges 8, 10, 24 and of the ring 14 is 14.6 inches; and the range of axial adjustment of the tube 30 is such that the position of the downstream end of the tube 30 may be level with the apex of the end 20 of the working tube 12 or may project into the working tube by a distance of up to 1 inch beyond the bevel 20 or may be at any intermediate position.

Figure 6:
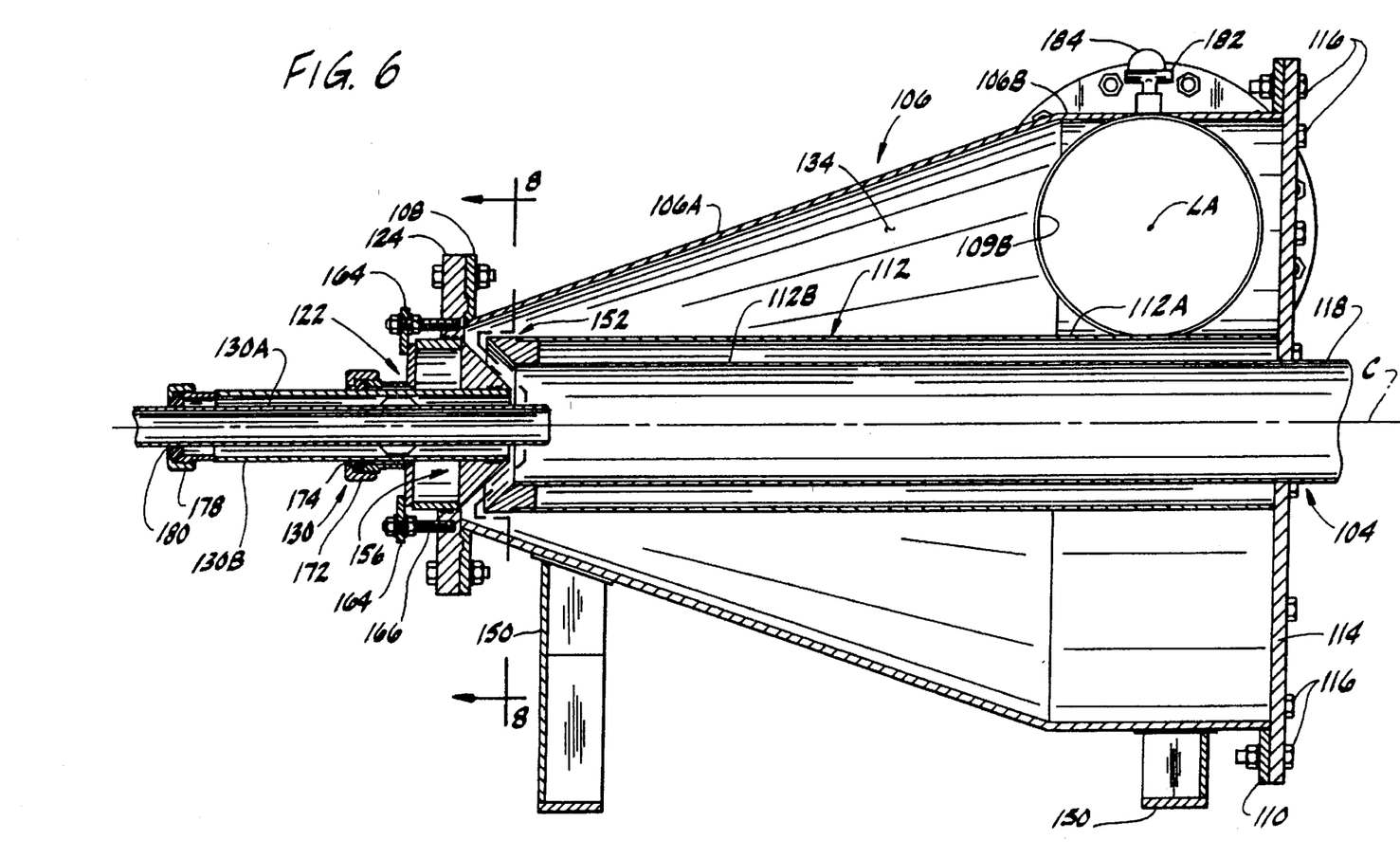
FIG. 6 is a longitudinal section of the apparatus of FIG. 5.

Referring now to FIGS. 5–10, apparatus of a second, most preferred embodiment is shown. The reference numerals used to indicate parts in the second embodiment corresponding to parts of the first embodiment will be equal to the reference numeral of the first embodiment, plus 100. The casing of the second embodiment (generally indicated at 106) includes a frustoconically shaped upstream portion 106A and a cylindrically shaped downstream portion 106B. The apparatus is supported by two saddles 150 under the casing 106 which cradle the casing. As shown in FIG. 6, the cross sectional dimension of the upstream portion 106A of the casing decreases generally from the pipe 109 toward a first inlet tube assembly (generally indicated at 130). The working tube 112 is surrounded by the chamber 134 and shares a common central axis C. The working tube 112 ("tubular structure") defines the inner periphery of the chamber 134 and is cylindrical so that the chamber is constricted toward the first inlet tube assembly 130 because of the decreasing cross sectional dimension of the upstream portion of the casing 106A. It has been found that the constriction of the chamber 134 toward the inlet end results in high air velocities within the working tube 112 which produces greater drying and permits the mixture to be fed at a higher rate through the apparatus.

Figure 7:
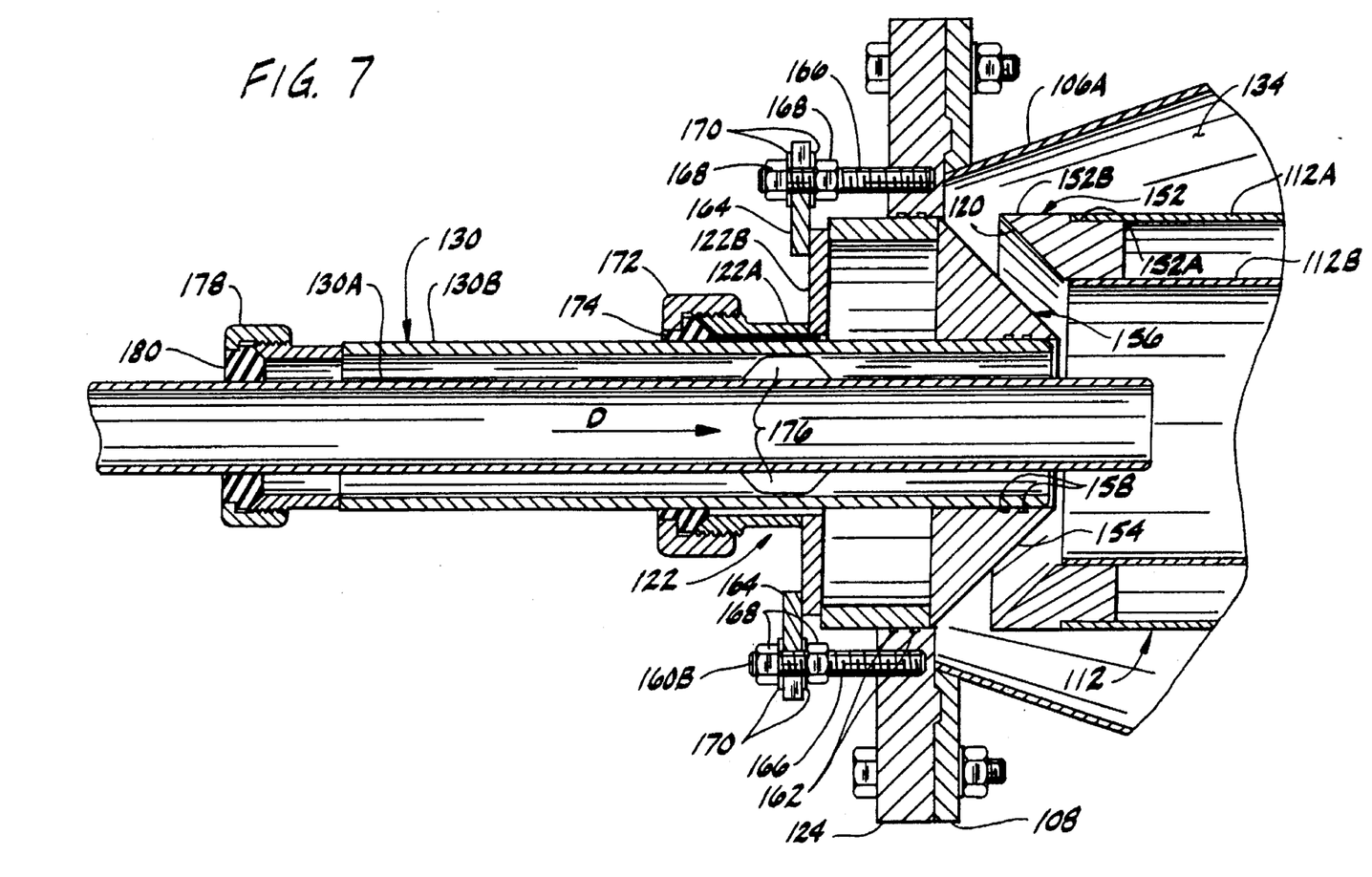
FIG. 7 is an enlarged, fragmentary view of FIG. 6.

Inside the casing 106, the working tube 112 includes an outer cylindrical jacket 112A surrounding a cylindrical inner portion 106B of the working tube. In the second embodiment, the outlet tube 118 is the extension of the inner portion 112B of the working tube through the ring 114 to outside of the casing 106. At their upstream ends, the jacket 112A and inner portion 112B define an annular opening in which is received an annular throat end piece, generally indicated at 152. As shown in FIG. 7, the throat end piece 152 includes an end face having the bevel 120 of the working tube 112. The upstream end of the jacket 112A lies in an annular recess 152A at the downstream end of the throat end piece, and a portion 152B of the end piece upstream from the recess is flush with the cylindrical exterior surface of the jacket. In this way a smooth exterior surface of the working tube 112 is presented which does not substantially interfere with the spiralling flow of air in the chamber 134 around the working tube.

Figure 8:
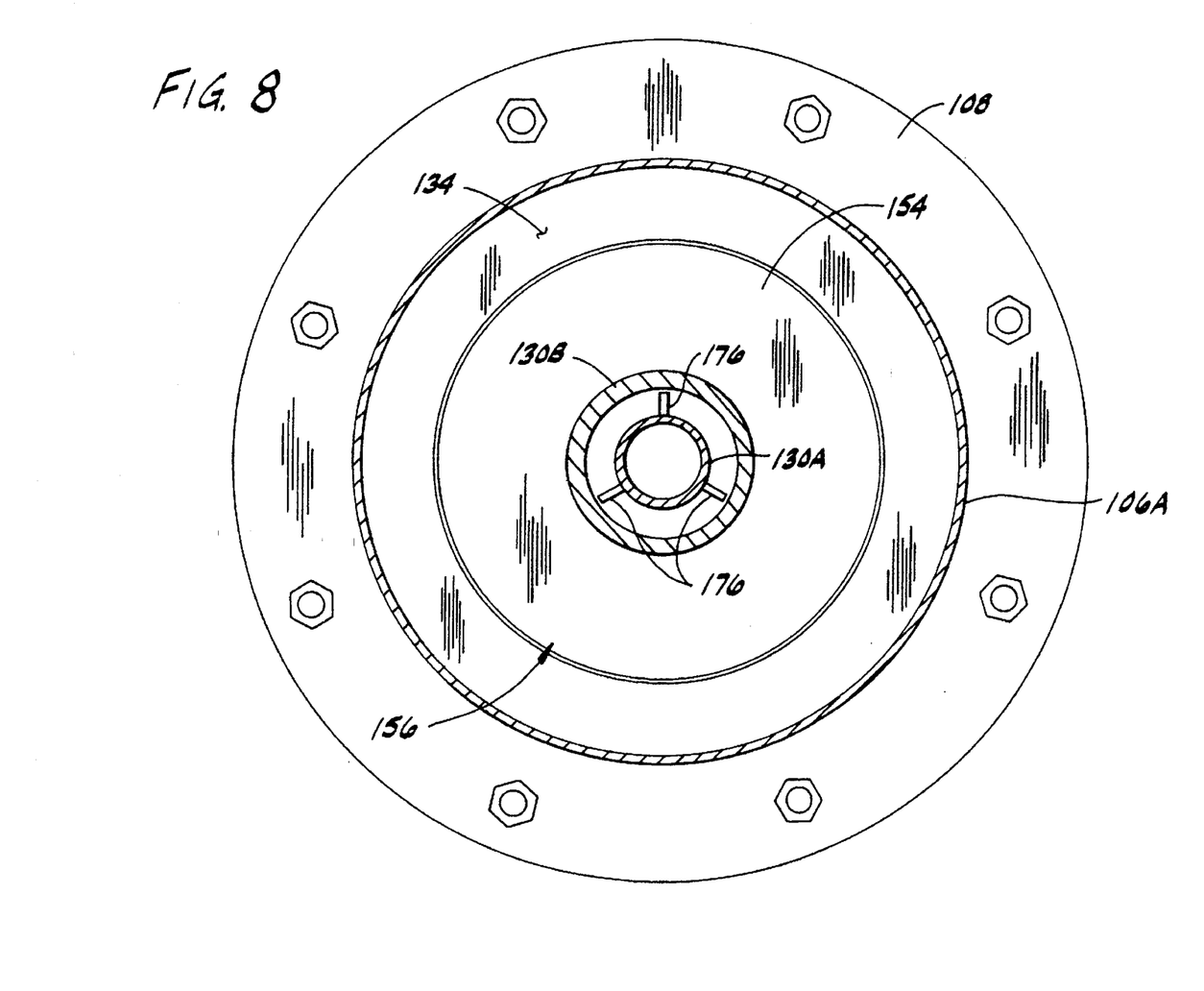
FIG. 8 is a section on the line VIII—VIII of FIG. 6.

Referring now particularly to FIGS. 7 and 8, an annular end surface 154 generally adjacent to the upstream end of the working tube 112 facilitates redirection of the spiralling flow of air from an upstream direction in the chamber to a downstream direction in the working tube. The end surface 154 does not lie in a plane which is perpendicular to the direction of flow D of matter through the working tube, but is shaped to facilitate changing the direction of flow of the air. Instead of permitting the pressurized fluid to impact against the inlet end of the chamber 134 and move downward, the end surface 154 guides the air toward the throat. In the preferred embodiment, the end surface 154 is defined on the exterior surface of a throat member (generally indicated at 156) located in the chamber 134 generally adjacent the upstream end of the working tube 112. The throat member 156 extends axially inward from the inlet end of the chamber toward the working tube 112. The throat is defined in the second embodiment between the end surface 154 ("first annular surface") on the throat member 156 and the bevelled end face 120 ("second annular surface"). Both the end surface 154 and the bevelled end face 120 slope radially inward in a downstream direction with respect to the central axis C of the working tube 112. The throat member 156 is movable to control the effective width of the throat, through which the inner portion 112B of the working tube communicates with the chamber 134.

Figure 9:
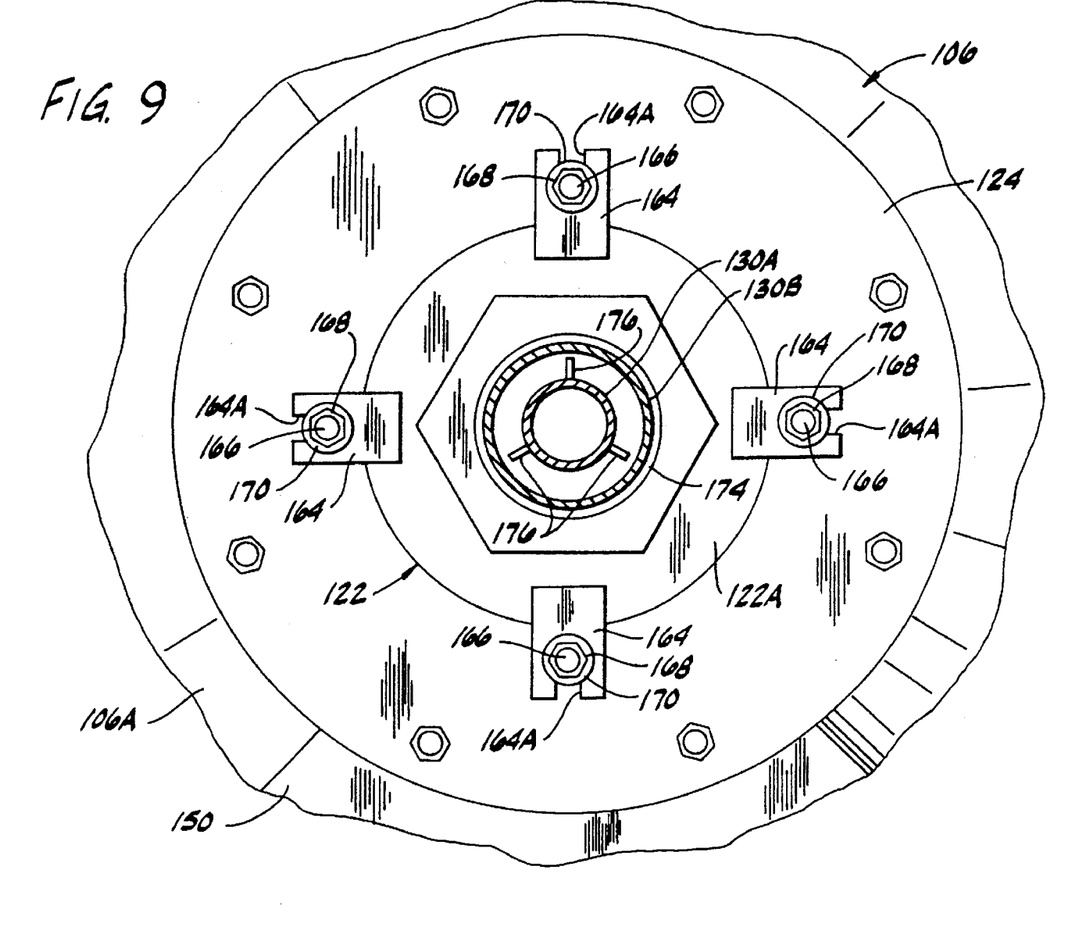
FIG. 9 is a fragmentary section on line IX—IX of FIG. 5.

The inlet tube 30 of the first embodiment has been replaced by the inlet tube assembly 130 including a first feed tube 130A and a second feed tube 130B. The throat member 156 extends around the second feed tube 130B and is sealingly, but slidingly engaged with the second feed tube by a pair of O-rings 158 received in internal, annular grooves in the throat member. The throat member 156 is fixedly connected to a tubular mounting collar (indicated generally at 122) sealingly and slidingly received in a central opening of a mounting ring 124 (corresponding generally to the radial flange 24 of the first embodiment) bolted to the annular flange 108 of the casing 106. Sealing engagement of the mounting collar 122 in the central opening is achieved by another pair of O-rings 162 received in annular grooves on the internal diameter of the mounting ring 124. The mounting collar 122 includes a cylindrical upstream portion 122A and a cylindrical downstream portion 122B having a larger diameter than the upstream portion. As shown in FIG. 9, the downstream portion 122B has four tabs 164 extending radially outwardly to respective threaded positioning bolts 166 fixedly connected to the mounting ring 124. Each tab 164 has a slot 164A at its radially outward end which receives a corresponding positioning bolt 166. The tab 164 is captured on the positioning bolt 166 between nuts 168 threaded onto the bolt on opposite sides of the tab (FIG. 7). A washer 170 is interposed between each nut 168 and the tab 164. The axial position of the nuts 168 on the positioning bolts 166 can be changed by threading the nuts in an axial direction on the bolts, permitting the axial position of the mounting collar 122 to be changed. The throat member 156 is movable conjointly with the mounting collar 122 such that its axial position in the chamber 134 and spacing of the conical end surface 154 from the bevelled end face 120 may be changed. Axially inward repositioning of the throat member 156 reduces the cross sectional area of the throat in communication with the chamber 134, while axially outward repositioning of the throat member increases the cross sectional area of the throat in communication with the chamber.

The second feed tube 130B passes through the mounting collar 122 into the chamber 134, and is releasably secured to the mounting collar by a first annular cap 172 and first elastomeric ring 174. The first cap 172 has internal threads adapted for threaded engagement with external threads on the upstream portion 122A of the mounting collar 122. The elastomeric ring 174 is disposed around the second feed tube 130B and partially within the annular open end of the upstream portion 122A. The first cap 172 may be screwed onto the upstream portion 122A to compress the elastomeric ring 174 against the second feed tube 130B with the ring sealing with and gripping the exterior surface of the second feed tube to hold it in fixed relation to the mounting collar 122.

As shown in FIG. 7, the first feed tube 130A passes through the second feed tube 130B and the mounting collar 122, and has fins 176 which are engageable with the second feed tube to locate the first feed tube within the second feed tube. The upstream end of the second feed tube 130B is threaded and receives a second internally threaded annular cap 178 for compressing a second elastomeric ring 180 against the exterior surface of the first feed tube 130A to seal with and grip the first feed tube and hold it in fixed relation to the second feed tube and mounting collar 122. Thus, the first feed tube 130A can be positioned axially relative to the working tube 112 and throat member 156 by unscrewing the second cap 178 from the threaded end of the second feed tube 130B to release the grip of the second elastomeric ring 180. The first feed tube 130A is then free to slide axially relative to the working tube 112 and the throat member 156 to position the downstream end of the first feed tube in the optimal location for the particular type of mixture. The first and second caps 172, 178 and elastomeric rings 174, 180 constitute "holding means". The mounting ring 124, mounting collar 122, and first and second caps 172, 178 and elastomeric rings 174, 180 constitute "mounting means".

Figure 10:
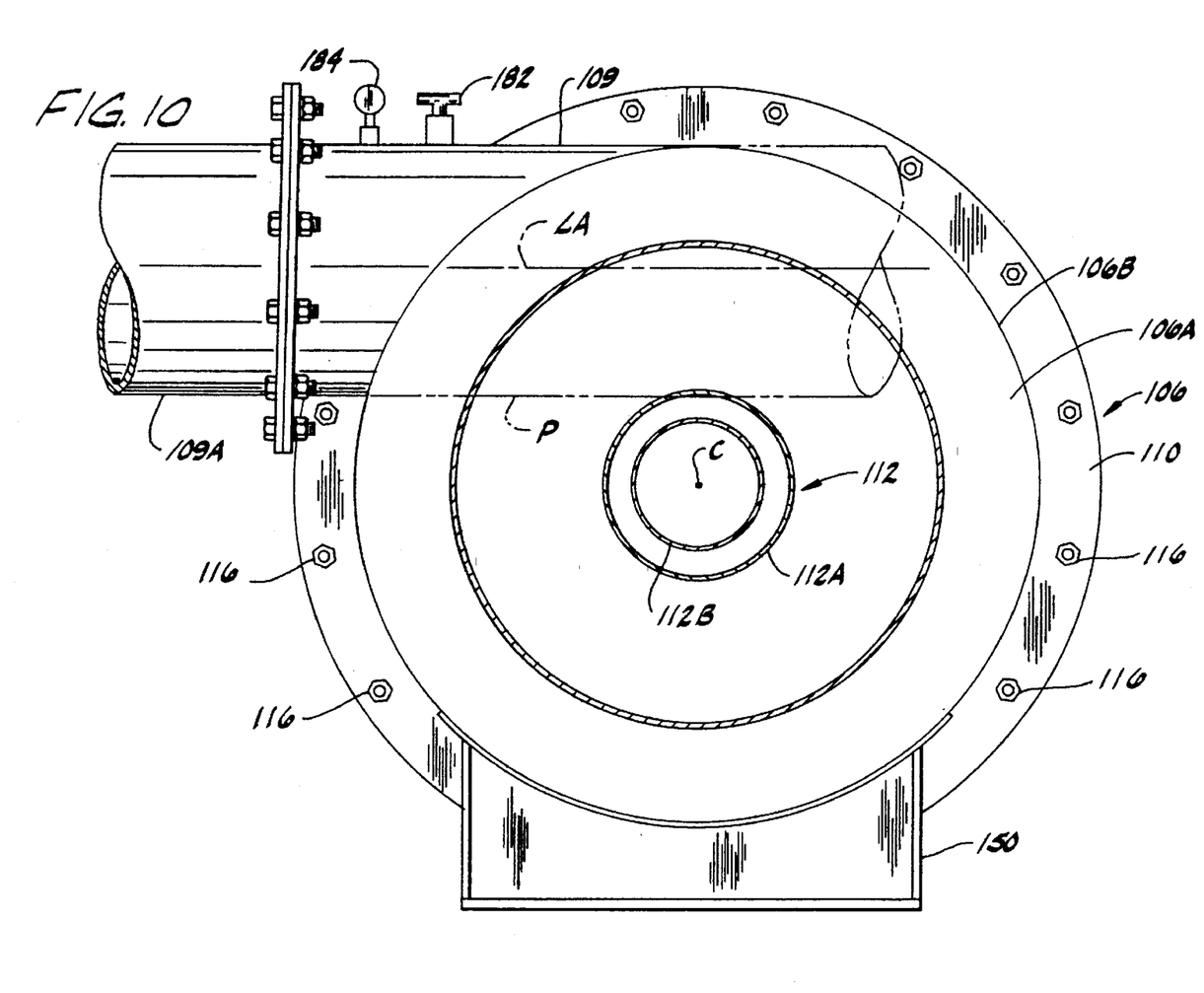
FIG. 10 is a section on the line X—X of FIG. 5 and showing an imaginary projection of an opening of a second inlet of the apparatus.

The pipe 109 introducing drying air into the chamber is located at the outlet end of the casing 106, and is formed as part of the casing. As shown in FIG. 10, the pipe 109 is secured to a feeder pipe 109A leading to a source of air under pressure (described below). A temperature gage 182 and pressure gage 184 are provided on the pipe 109 to monitor the pressure and temperature of the air entering the chamber 134. As may be seen in FIG. 7, the pipe 109 has an opening 109B positioned in the chamber for delivering drying air into the chamber 134 in a direction which is generally circumferential to the chamber. The opening 109B and working tube 112 are arranged such that there is not substantial impact of fluid exiting the pipe 109 into the chamber 134 against the working tube. More specifically, an imaginary projection P (FIG. 10) of the opening 109B into the chamber 134 would not intersect a plane parallel to the longitudinal axis LA of the projection and including the central axis C of the working tube. In fact, less than one quarter of the projected opening P lies on the jacket 112A of the working tube. Thus, the path of the air admitted into the chamber from the pipe 109 does not substantially intersect the working tube 112. In this way, the flow is not split by the working tube 112 and undesired turbulence is not introduced into the flow of air within the chamber 134. Instead, the flow of air is directed by the tubular/frustoconical interior walls of the casing 106 into the desired spiralling flow. The casing 106, working tube 112 and throat member 156 are made of a suitable corrosion resistant material such as 304 stainless steel. The casing 106 is electro-polished to a mirror finish on its interior surface and the working tube 112 is similarly polished on the exterior surface of the jacket 112A and interior surface of the inner portion 112B to facilitate free spiralling flow of air within the chamber 134 and working tube. The end surface 154 defined on the throat member 156 is also electro-polished.

Figure 11:
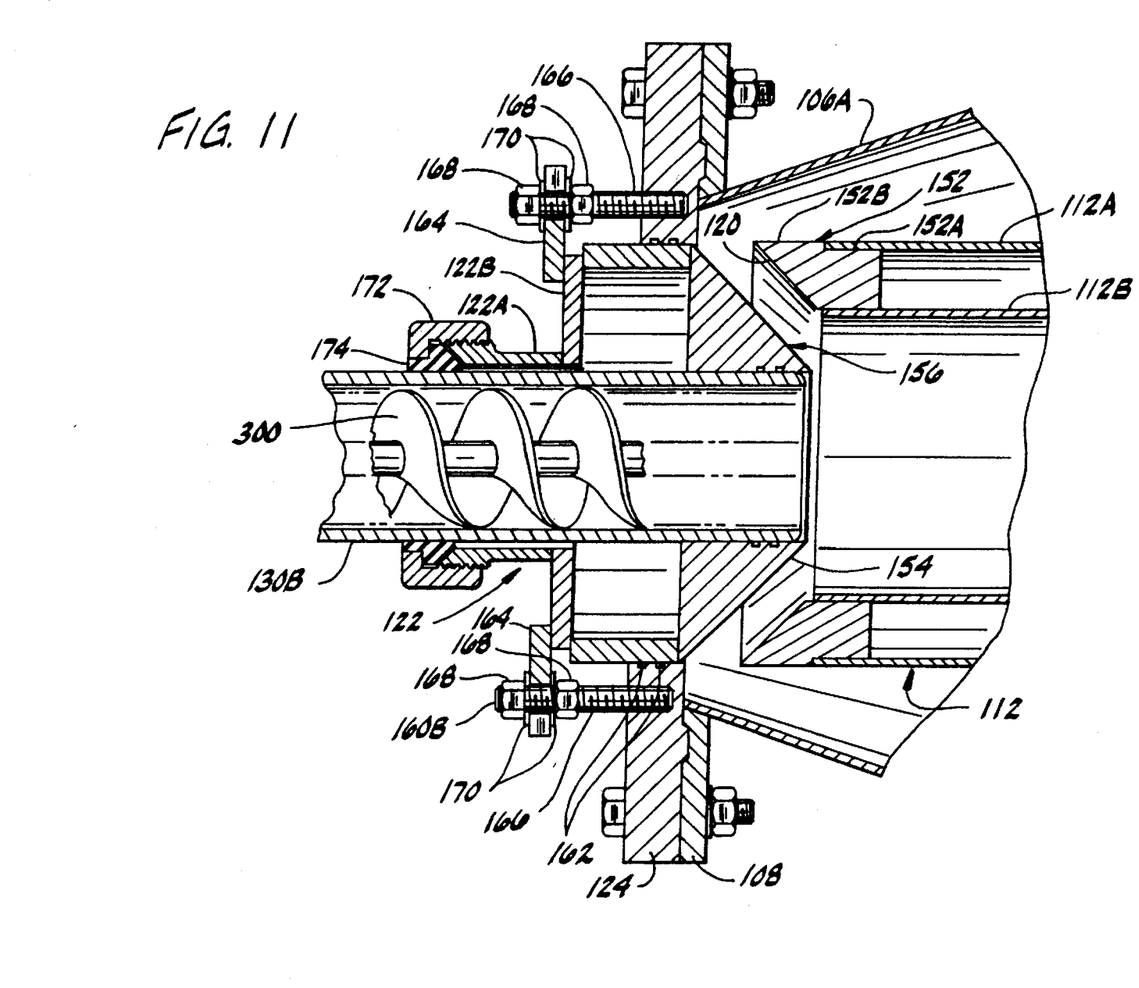
FIG. 11 is an enlarged, fragmentary view similar to FIG. 7, but showing a third embodiment having an auger to feed the mixture.

A third embodiment of the apparatus shown in FIG. 11 discloses the purpose of the second feed tube 130A of the second embodiment. Parts of the apparatus of the third embodiment corresponding to similar parts of the second embodiment will be identified by the same reference numerals. Certain mixtures do not flow readily and are not easily pumped through the first feed tube 130A of the second embodiment. In that event, the first feed tube 130A can be removed entirely, and an auger 300 can be installed in the second feed tube 130B to feed the mixture into the working tube 112. Once in the working tube, the mixture is caught up in the vortex and moisture is evaporated from the mixture as before. The second feed tube 130B can be positioned relative to the working tube 112 and throat member 156 by releasing the first cap 172 and elastomeric ring 174 and sliding the second feed tube axially. It will be understood by those of ordinary skill in the art that if the apparatus will be always used to dry one type of mixture, it will be unnecessary to provide both a first feed tube 130A and a second feed tube 130B.

Figure 12:
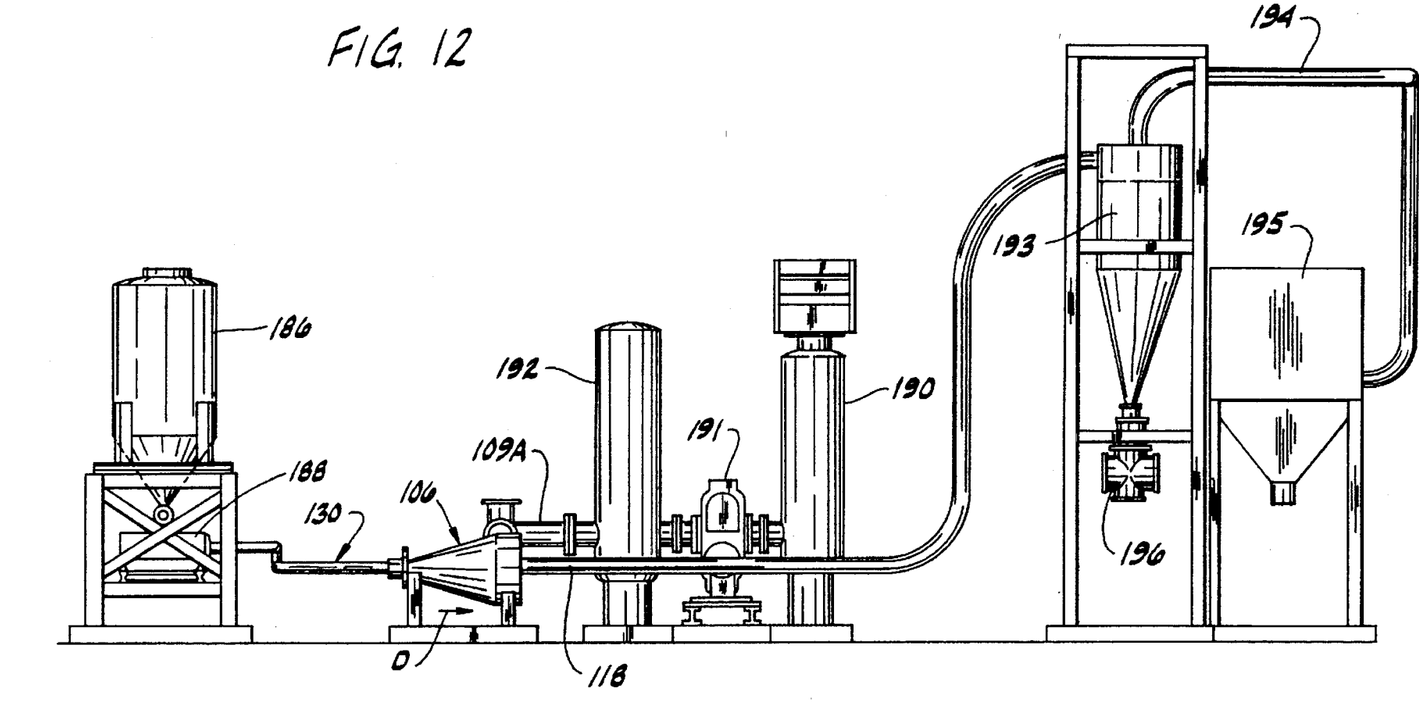
FIG. 12 is a schematic of a mixture separating system including the apparatus.

Referring now to FIG. 12, a system for drying a mixture using the apparatus of the present invention is shown to comprise a feed hopper 186 which holds the mixture (e.g., a coal slurry) requiring removal of moisture. The mixture moves from the feed hopper 186 into the first feed tube 130A by action of gravity, a pump 188 and/or under the vacuum being drawn in the working tube 112. Drying air is drawn into the system through a filtering and muffling tower 190 by a pump 191. The pump 191 is preferably selected, based on the size of the apparatus, to achieve an air flow through in the working tube 112 in the range of about 180 to 185 feet per second. Air leaving the pump 191 passes through a discharge muffling tower 192 before entering the feeder pipe 109A leading to the casing 106. The air exiting the pipe 109 in the casing 106 is deflected by the interior walls of the casing into a spiralling flow travelling toward the first inlet tube assembly 130.

As shown in FIG. 7, the spiralling flow of air is constricted by the upstream portion 106A of the casing as it travels toward the inlet end of the chamber 134. At the inlet end of the chamber 134, the spiralling flow engages the sloped end surface 154 of the throat member 156 which facilitates turning the direction of flow from generally upstream in the chamber to downstream in the working tube 112. The spiralling air enters the working tube 112 through the throat which has been regulated by the throat member 156 to achieve the constriction needed to produce the velocity and air mass flow in the working tube for the particular mixture. The operation of the apparatus is further adjusted for the particular mixture by axial location of the first feed tube 130A relative to the working tube 112. It is believed that upon entering the working tube 112 from the chamber 134, the pressure of the spiralling fluid drops causing the moisture in the mixture entering the working tube to vaporize. The violent spiralling action in the working tube 112 breaks apart and mixes the material in the mixture to produce uniform drying.

The dried mixture and water vapor exit the casing 106 and enter the outlet tube 118 to pass to a cyclone separator 193 (or other suitable separator device) which separates the water vapor from the denser solid components. The water vapor and any fine particulate matter entrained therein pass out of the top of the separator through a pipe 194 to a bag house 195 for filtering the particulates out of the air before it is discharged to the atmosphere. The desired component (e.g., coal) is recovered through an outlet 196 at the bottom of the separator 193.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for separating the components of a mixture, comprising a first inlet to admit the mixture, a second inlet to admit a fluid under pressure, an outlet for the components of the mixture and the fluid and an outer sleeve at least partially defining a chamber into which the second inlet leads, the fluid admitted into the chamber moving in a spiralling flow therein, the downstream end of the first inlet communicating with an open end of a tubular structure working tube defining a working region of the apparatus such that the mixture passes from the first inlet to the working region, the open end of the working tube having a smaller cross sectional area than the outer sleeve, the working region communicating with the chamber by means of a throat through which the spiralling fluid in the chamber is drawn into the working region, the throat being defined between the downstream end of the first inlet and the open end of the working tube and being a constriction through which the spiralling fluid in the chamber is drawn into the working region.

2. Apparatus according to claim 1 wherein the chamber has an inner periphery defined by the working tube and, an outer periphery defined by the outer sleeve, the chamber thus being annular and surrounding the working region to provide a compact arrangement.

3. Apparatus according to claim 1 wherein said one end of the working tube is bevelled so as to provide between the bevelled end of the tube and the first inlet a throat of progressively decreasing cross-sectional area in the direction of travel of the fluid as it enters the working region.

4. Apparatus according to claim 1 wherein the first inlet comprises an inlet tube which is co-axial with the working tube, the working tube having a larger diameter than the inlet tube, the latter being adjustable in an axial direction to vary the effective width of the throat and, therefore, the extent of suction in the working region when the apparatus is in use.

5. Apparatus according to claim 1 wherein the fluid is gaseous and the second inlet enters the chamber in a tangential direction with respect to the chamber so as to promote the desired spiralling flow of the fluid within the chamber.

6. Apparatus according to claim 1 wherein the working region is defined within a working tube having an upstream end for entry of the mixture and said fluid under pressure into said working region, the chamber surrounding the working tube, the cross sectional dimension of the chamber decreasing generally from the second inlet toward the first inlet.

7. Apparatus according to claim 6 further comprising an end surface adjacent the upstream end of the working tube which does not lie in a plane perpendicular to the direction of flow of the mixture through the chamber, the end surface being shaped to facilitate redirection of the spiralling fluid flow as it passes from the chamber to the working region.

8. Apparatus according to claim 7 wherein said end surface comprises an annular exterior surface of a throat member located adjacent the upstream end of the working tube, the throat being defined between said end surface of the throat member and the upstream end of the working tube, the throat member being movable in an axial direction relative to the working tube to change the effective width of the throat in communication with the chamber.

9. Apparatus according to claim 8 wherein the upstream end of the working tube has an annular end face which is bevelled to slope radially inward in a downstream direction with respect to the flow through the working region of the working tube, the throat being defined between the bevelled annular end face of the working tube and the annular end surface of the throat member.

10. Apparatus according to claim 9 wherein the first inlet comprises a tube which is generally co-axial with the working tube, the first inlet tube being adjustable in an axial direction relative to the working tube and throat member, and wherein the apparatus further comprises means for mounting the throat member and the first inlet tube on the apparatus, said mounting means comprising a tubular mounting collar through which the first inlet tube extends, and holding means associated with the mounting collar for releasably gripping an exterior surface of the first inlet tube to hold the first inlet tube in a fixed position relative to the mounting collar.

11. Apparatus as set forth in claim 10 wherein said holding means comprises and elastomeric ring around the first inlet tube and an annular cap around the first inlet tube adapted for threaded attachment to the mounting collar of said mounting means, the cap being adapted to compress the elastomeric ring into gripping engagement with the first inlet tube upon attachment of the cap to the mounting collar.

12. Apparatus according to claim 7 wherein the second inlet comprises a second inlet tube having an opening into the chamber arranged for directing fluid entering the chamber in a direction generally tangential to the outer periphery of the chamber, the opening and working tube being arranged such that the opening, as projected inwardly into the chamber in the direction of fluid flow through the opening, projects less than one quarter of the total projected area of the opening onto the working tube.

13. Apparatus for separating the components of a mixture comprising:

a casing enclosing a chamber having a central axis;

a tubular structure in the casing defining a working region;

a first inlet for admitting mixture into an upstream end of the working region;

a second inlet for admitting pressurized fluid into the chamber, the fluid admitted into the chamber moving in spiralling fashion from the second inlet toward the first inlet;

the upstream end of the working region communicating with the chamber by way of a throat through which the spiralling fluid is drawn from the chamber into the working region, the movement of said spiralling fluid undergoing a change in direction as it passes from the chamber into the working region by way of said throat; and an end surface adjacent the upstream end of the working region not lying in a plane perpendicular to the central axis of the chamber, the end surface being shaped to facilitate said change in direction of the spiralling fluid flow as it passes from the chamber into the working region.

14. Apparatus according to claim 13 wherein said chamber is annular in shape, and wherein the tubular structure is generally coaxial with and surrounded by the annular chamber.

15. Apparatus according to claim 13 wherein the end surface comprises a first annular surface around the first inlet, the first annular surface cooperating with a second annular surface on the tubular structure at the upstream end of the working region to define the throat.

16. Apparatus according to claim 15 wherein the first and second annular surfaces slope radially inwardly in downstream direction with respect to a central axis of the tubular structure defining the working region.

17. Apparatus according to claim 16 wherein the first inlet comprises a tube, and wherein the first annular surface is an exterior surface on an annular throat member encircling the first inlet tube, and further comprising means for mounting the throat member for axial movement toward and away from the upstream end of the tubular structure for varying the spacing between the annular surfaces defining the throat.

18. Apparatus according to claim 17 wherein the first inlet tube is axially adjustable relative to the throat member and relative to the tubular structure defining the working region, and means for holding the first inlet tube in a selected position of axial adjustment relative to the throat member and tubular structure defining the working region.

19. Apparatus as set forth in claim 18 wherein said mounting means comprises a tubular mounting collar through which the first inlet tube is received, and wherein said holding means releasably grips an exterior surface of the first inlet tube and is adapted to hold the first inlet tube in a fixed position relative to the mounting collar.

20. Apparatus as set forth in claim 19 wherein said holding means comprises an elastomeric ring around the first inlet tube and an annular cap around the first inlet tube adapted for threaded attachment to the mounting collar of said mounting means, the cap being adapted to compress the elastomeric ring into gripping engagement with the first inlet tube upon attachment of the cap to the mounting collar.

21. Apparatus for separating the components of a mixture comprising:

a casing defining a chamber having a central axis;

a tubular structure defining a working region;

a first inlet for admitting the mixture into an upstream end of the working region;

a second inlet for admitting pressurized fluid into the chamber, the fluid admitted into the chamber moving in a spiralling fashion from the second inlet toward the first inlet;

the chamber decreasing in cross sectional dimension generally from the second inlet toward the first inlet;

the upstream end of the working region communicating with the chamber by way of a throat through which the spiralling fluid is drawn into the working region.

22. Apparatus according to claim 21 wherein said chamber is annular in shape, and wherein the tubular structure is generally coaxial with and surrounded by the annular chamber, the cross sectional dimension of the casing decreasing generally from the second inlet toward the first inlet.

23. Apparatus for separating the components of a mixture comprising:

a casing enclosing an annular chamber having a central axis;

a tubular structure in the casing surrounded by and generally coaxial with the annular chamber, the tubular structure defining a working region;

a first inlet for admitting mixture into an upstream end of the working region;

a second inlet for admitting pressurized fluid into the chamber, the second inlet comprising a second inlet tube arranged for the delivery of pressurized fluid into the annular chamber in a circumferential direction with respect to the chamber, the fluid in the chamber moving in a spiralling fashion from the second inlet toward the first inlet;

the upstream end of the working region communicating with the chamber by way of a throat through which the spiralling fluid is drawn into the working region.

24. Apparatus as set forth in claim 23 wherein the second inlet tube is so sized and located relative to the chamber that a stream of pressurized fluid entering the chamber through the second inlet tube is directed circumferentially with respect to the chamber to spiral around the tubular structure without substantial impact against the tubular structure.

25. Apparatus as set forth in claim 24 wherein the second inlet tube communicates with the chamber via an opening which, as projected inwardly into the chamber in the direction of fluid flow through the opening, projects less than one-quarter of the total projected area of the opening onto the tubular structure.

26. Apparatus for separating the components of a mixture comprising:

a casing defining a chamber having a central axis;

a tubular structure defining a working region;

a first inlet for admitting the mixture into an upstream end of the working region;

the first inlet comprising a tube which is generally co-axial with the working region, the first inlet tube being adjustable in an axial direction relative to working region;

means for mounting the first inlet tube on the apparatus, said mounting means comprising a tubular mounting collar through which the first inlet tube extends;

holding means connected to the mounting collar for releasably gripping an exterior surface of the first inlet tube to hold the first inlet tube in a fixed position relative to the mounting collar;

a second inlet to admit pressurized fluid into the chamber moving in a spiralling fashion from the downstream end of the chamber to the upstream end of the chamber;

the upstream end of the working region communicating with the chamber by way of a throat through which the spiralling fluid is drawn into the working region.

27. Apparatus as set forth in claim 26 wherein said holding means comprises and elastomeric ring around the first inlet tube and an annular cap around the first inlet tube adapted for threaded attachment to the mounting collar of said mounting means, the cap being adapted to compress the elastomeric ring into gripping engagement with the first inlet tube upon attachment of the cap to the mounting collar.

* * * * *